(12) United States Patent
Alferness et al.

(10) Patent No.: US 7,130,270 B2
(45) Date of Patent: Oct. 31, 2006

(54) METHOD AND APPARATUS FOR VARYING BANDWIDTH PROVIDED TO VIRTUAL CHANNELS IN A VIRTUAL PATH

(75) Inventors: Merwin Herscher Alferness, Rochester, MN (US); Glen Howard Handlogten, Rochester, MN (US); James Francis Mikos, Rochester, MN (US); David Alan Norgaard, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1068 days.

(21) Appl. No.: 10/206,170

(22) Filed: Jul. 26, 2002

(65) Prior Publication Data
US 2004/0017781 A1   Jan. 29, 2004

(51) Int. Cl.
*H04J 1/16* (2006.01)

(52) U.S. Cl. .................................... 370/235; 370/399
(58) Field of Classification Search ................ 370/252, 370/253, 235, 229, 389, 397, 399, 351, 409, 370/429
See application file for complete search history.

(56) References Cited

U.S. PATENT DOCUMENTS

| 5,629,937 | A | * | 5/1997 | Hayter et al. | 370/233 |
| 6,091,708 | A | * | 7/2000 | Matsunuma | 370/233 |
| 6,262,986 | B1 | * | 7/2001 | Oba et al. | 370/399 |

\* cited by examiner

*Primary Examiner*—Brenda Pham
(74) *Attorney, Agent, or Firm*—Dugan & Dugan

(57) ABSTRACT

In a scheduler circuit for a network processor, bandwidth assigned to a virtual path is allocated among virtual channels associated with the virtual path. The allocation of bandwidth among the virtual channels is varied dynamically as virtual channels become active or inactive.

8 Claims, 7 Drawing Sheets

METHOD AND APPARATUS FOR VARYING BANDWIDTH PROVIDED TO VIRTUAL CHANNELS IN A VIRTUAL PATH

FIELD OF THE INVENTION

The present invention is concerned with data and storage communication systems and is more particularly concerned with such systems in which plural virtual channels are associated in a virtual path.

BACKGROUND OF THE INVENTION

Data and storage communication networks are in widespread use. In many data and storage communication networks, data packet switching is employed to route data packets or frames from point to point between source and destination, and network processors are employed to handle transmission of data into and out of data switches. An example of a network processor is disclosed in commonly-assigned patent application Ser. No. 10/102,343, filed Mar. 20, 2002. This commonly-assigned patent application is incorporated herein by reference in its entirety.

A network processor typically includes a scheduler circuit which determines an order in which frames are transmitted by the network processor.

FIG. 1 is a block diagram that shows a conventional scheduler circuit for a network processor, together with external memories utilized by the scheduler circuit. In FIG. 1, reference numeral 10 generally indicates the scheduler circuit. The scheduler circuit 10 includes an interface (I/F) block 12, a first-in-first-out (FIFO) buffer 14, a queue manager block 16, a calendars block 18, a "winner" block 20 and a memory manager block 22. Coupled to the memory manager block 22 are external memories 24, 26.

The interface block 12 handles exchanging of messages between the scheduler circuit 10 and a data flow circuit (not shown) to which the scheduler circuit 10 is coupled. As is familiar to those who are skilled in the art, the data flow circuit handles the actual data to be transmitted, whereas the scheduler circuit 10 works with frame pointers that indicate the location of the data in a data flow memory (not shown), and instructs the data flow circuit on which data to transmit.

The FIFO buffer 14 is provided to buffer incoming messages for the scheduler circuit 10, and is coupled to the interface circuit 12. The queue manager block 16 is coupled to the FIFO buffer 14 and takes appropriate action upon receipt of new frames to be transmitted. The calendars block 18 stores one or more schedules (also referred to as "time wheels") which indicate an order in which flows are to be serviced. As is familiar to those who are skilled in the art, a "flow" is a logical connection between a source and a destination. Flows are sometimes referred to as virtual connections or virtual channels (VC's).

The winner block 20 is coupled to the calendars block 18 and selects flows to be serviced on the basis of information stored in the calendars block 18. The memory manager block 22 is coupled to the queue manager block 16 and the winner block 20, and handles storage and retrieval of data with respect to the external memories 24, 26. The external memories 24, 26 store data such as flow queues and flow queue control blocks (sometimes also referred to as flow control blocks or queue control blocks). Depending upon the number of flows to be handled by the scheduler circuit 10, the external memories 24, 26 may be dispensed with, and internal memory (not shown) associated with the memory manager block 22 may be used for storing flow queue control block information.

FIG. 2 is a schematic representation of a conventional flow queue. As is familiar to those who are skilled in the art, a flow queue includes a linked list (indicated at 28) which contains frame pointers indicative of data frames associated with a flow which have been received for transmission. The first frame pointer in the linked list 28 is referred to as the "head" of the queue and is indicated at 30. The last frame pointer in the linked list 28 is referred to as the "tail" of the queue as indicated at 32. Also associated with the flow queue is a header 34 that identifies the flow associated with the flow queue.

The flow queue control block, which is not shown, contains flow configuration information, such as the desired flow average rate or bandwidth, which may be based on a contracted Quality of Service (QoS) for the flow. The flow queue control block also contains flow run time information which is required by the scheduler circuit 10 to support the desired flow configuration.

FIG. 3 schematically represents a time wheel 35 of the type stored in the calendars block 18. The time wheel 35 is made up of a number of slots 36. Each slot corresponds to a present or future cycle in which a frame may be transmitted. A flow queue identifier (fqid) may be entered into a slot to indicate that the corresponding flow is to be serviced in the cycle represented by the slot. A "current time" (CT) pointer 38 is associated with the time wheel 35 and points to the slot of the time wheel 35 which represents the cycle which is currently to be serviced. A flow identified by a flow queue identifier in the slot pointed to by the CT pointer (in this particular example, slot number 2) is serviced by transmitting the head frame in the corresponding flow queue. The flow is then "reattached" to the time wheel 35 by entering the corresponding flow queue identifier in a later slot of the time wheel 35. The later slot is the one which corresponds to a "next service time" (NST). The NST is determined by adding to the current time (CT) a parameter known as a "sustained service distance" (SSD). The SSD is stored in the flow queue control block that corresponds to the flow in question, and reflects the QoS for the flow. In general, the higher the bandwidth or rate to which the flow is entitled, the shorter the SSD. In the particular example illustrated in FIG. 3, it is assumed that the SSD is "4", so that the slot to which the flow is reattached is determined by adding the CT (having a value of "2") with the SSD having a value of "4", indicating that slot 6 is the slot to which the flow is to be reattached.

Contention for a time wheel slot is handled by conventional practices, such as "chaining" or queuing of contending flows within a time wheel slot.

Referring again to FIG. 1, incoming messages for the scheduler 10 are indicated at 40, and outgoing messages from the scheduler 10 are indicated at 42. The incoming messages indicated at 44, namely "CabRead.request" and "CabWrite.request" and the outgoing messages indicated at 46, namely "CabRead.response" and "CabWrite.response", are concerned with configuring flows. The "PortStatus.request" message 48 informs the calendars block 18 when servicing of flows must be suspended to implement a "back pressure" arrangement. The concept of back pressure is familiar to those who are skilled in the art and need not be further discussed.

The incoming message indicated at 50, namely "FlowEnqueue.request" is a message indicating arrival of a new frame to be transmitted by the network processor, and to be scheduled by the scheduler circuit 10. The "FlowEnqueue-
.response" message indicated at 52 is an acknowledgment of
the "FlowEnqueue.request" message 50 by the queue manager block 16.

The "PortEnqueue.request" message indicated at 54 is an
instruction from the winner block 20 of the scheduler circuit
10 to the data flow circuit (not shown) to enqueue a
particular data frame for transmission based on a flow queue
identifier read from the CT (current time) slot of a time
wheel in the calendars block 18.

In operation, FlowEnqueue.request messages 50 are
received by the scheduler circuit 10 from time to time. Each
FlowEnqueue.request message 50 points to a new frame that
has arrived for a particular flow. In response to the FlowEnqueue.request message 50, the queue manager block 16
fetches the flow queue control block for the particular flow
in question. The flow queue control block indicates the
number of frames waiting in the flow queue. If the number
is non-zero (i.e., the flow queue is not empty), then the
newly arrived frame is simply added at the tail of the flow
queue. If the flow queue is empty, a next service time (NST)
parameter stored in the flow queue control block is compared with the current time (CT) for the time wheel in the
calendars block 18 to determine whether the next service
time for the flow in question has already occurred. If so, the
newly arrived frame is immediately dispatched via a PortEnqueue.request message 54 issued by the winner circuit
20. If the next service time for the flow has not already
occurred, the flow is attached to the time wheel at the
indicated NST, and the frame is enqueued to the flow queue
(thereby becoming both the head and the tail of the flow
queue).

Servicing of flows by the scheduler 10, and in particular
by the winner block 20, is as follows. The current time (CT)
pointer advances to the next slot of the time wheel and a flow
queue identifier is read from that slot. Then the flow queue
control block for that flow is fetched. The winner block 20
then issues a PortEnqueue.request message 54 to cause the
frame at the head of the flow queue for the flow in question
to be enqueued for transmission by the data flow circuit (not
shown). The winner block 20 also calculates a next service
time (NST) as the sum of current time (CT) and the SSD
parameter stored in the flow queue control block.

It is then determined whether the frame just enqueued for
transmission was the last frame in the flow queue. If so, then
the calculated value for NST is written to the flow queue
control block. If not, the flow is reattached to the time wheel
at the slot corresponding to the indicated NST.

It has been proposed to provide a "virtual path" feature in
a network processor. A "virtual path" is a group of virtual
channels that together share an assigned amount of bandwidth. According to a proposed manner of implementing a
virtual path, a path control block is provided. The path
control block points to a linked list of channel control
blocks, each of which corresponds to an active virtual
channel associated with the virtual path. A QoS parameter,
such as an SSD, is stored in the path control block and
reflects a bandwidth that is assigned to the virtual path and
is to be shared by the active virtual channels associated with
the virtual path.

No flow queue identifiers are attached to the time wheel
for virtual channels associated with the virtual path. Instead,
a path identifier which points to the path control block is
attached to the time wheel. When the current time pointer
points to the slot in which the path identifier is entered, the
path control block is fetched. The path control block points
to the first channel control block in a list of channel control
blocks. The virtual channel which corresponds to the first
control block in the list is serviced by enqueuing for transmission the first frame in the flow queue which corresponds
to the virtual channel. The control block for that virtual
channel is then placed at the end of the list, and the path
control block is changed to point to the new head of the list
of channel control blocks. The path identifier is reattached to
the time wheel at a next service time (NST) that is calculated
based on a QoS parameter (e.g., SSD) for the virtual path.

This proposed manner of implementing virtual paths has
some disadvantages. For example, since the active virtual
channels are serviced in a round robin fashion, all virtual
channels are accorded an equal share of the path bandwidth,
which prevents flexibility in assigning bandwidths to the
virtual channels associated with the virtual path.

SUMMARY OF THE INVENTION

A first aspect of the invention provides for a method of
servicing a first virtual channel that is associated with a
virtual path. The inventive method includes transmitting a
frame associated with the first virtual channel, calculating an
enqueuement distance for the first virtual channel based on
a first parameter associated with the virtual path, and attaching the first virtual channel to a time wheel based on the
calculated enqueuement distance and current time pointer
for the time wheel.

The enqueuement distance may be calculated, for
example, based on a quotient obtained by dividing the first
parameter by a sum of second parameters each associated
with a respective active virtual channel associated with the
virtual path.

The inventive method may further include the step of
accessing a control block for the virtual path to determine
the first parameter and the sum of second parameters. In at
least one embodiment, the first parameter may be a Sustained Service Distance for the virtual path and the second
parameters may be Sustained Service Distances for the
respective virtual channels.

According to a second aspect of the invention, a method
of maintaining a control block for a virtual path is provided.
The method according to the second aspect of the invention
includes storing in the control block a first parameter associated with the virtual path, and storing in the control block
a sum of second parameters each associated with a respective active virtual channel associated with the virtual path.
The inventive method according to the second aspect of the
invention may further include updating the sum of second
parameters when an active virtual channel associated with
the virtual path becomes inactive and/or updating the sum of
second parameters when an inactive virtual channel associated with the virtual path becomes active. In at least one
embodiment, the first parameter may be a Sustained Service
Distance for the virtual path, and the second parameters may
be Sustained Service Distances for the respective virtual
channels.

According to a third aspect of the invention, a method of
updating a control block for a virtual path is provided. The
inventive method according to the third aspect of the invention includes receiving a frame associated with a virtual
channel that is associated with the virtual path, determining
whether a flow queue identifier for the virtual channel is
attached to a time wheel, and updating the control block for
the virtual path if the flow queue identifier for the virtual
channel is not attached to the time wheel.

In one or more embodiments, the flow queue identifier
may be determined not to be attached to the time wheel when it is determined that, at a time of receiving the frame, an attached bit in a control block for the virtual channel is not set. The updating step may include adding a parameter stored in a control block for the virtual channel to a parameter stored in the control block for the virtual path. The parameter stored in the control block for the virtual channel may be, for example, a Sustained Service Distance for the virtual channel, and the parameter stored in the control block for the virtual path may, for example, be a sum of respective Sustained Service Distances for active virtual channels associated with the virtual path.

According to a fourth aspect of the invention, a method of updating a control block for a virtual path is provided. The inventive method according to the fourth aspect of the invention includes determining whether a flow queue for a virtual channel associated with the virtual path is empty, and updating the control block for the virtual path if it is determined that the flow queue is empty.

The updating step may include subtracting a parameter stored in a control block for the virtual channel from a parameter stored in the control block for the virtual path. In at least one embodiment, the parameter stored in the control block for the virtual path may be a Sustained Service Distance for the virtual channel, and the parameter stored in the control block for the virtual path may be a sum of respective Sustained Service Distances for active virtual channels associated with the virtual path.

Numerous other aspects are provided, including scheduler circuits adapted to perform the inventive methods, and computer program products. Each inventive computer program product may be carried by a medium readable by a computer (e.g., a carrier wave signal, a floppy disk, a hard drive, a random access memory, etc.).

The present invention provides an implementation of a virtual path feature in a manner that allows the bandwidth assigned to the virtual path to be flexibly and dynamically allocated among virtual channels associated with the virtual path. Furthermore, the present invention provides for convenient implementation of the virtual path feature, since only relatively limited modifications to conventional arrangements for virtual channels are needed to implement the virtual path feature in accordance with the present invention.

Other objects, features and advantages of the present invention will become more fully apparent from the following detailed description of exemplary embodiments, the appended claims and the accompanying drawings.

DETAILED DESCRIPTION

Figure 1:
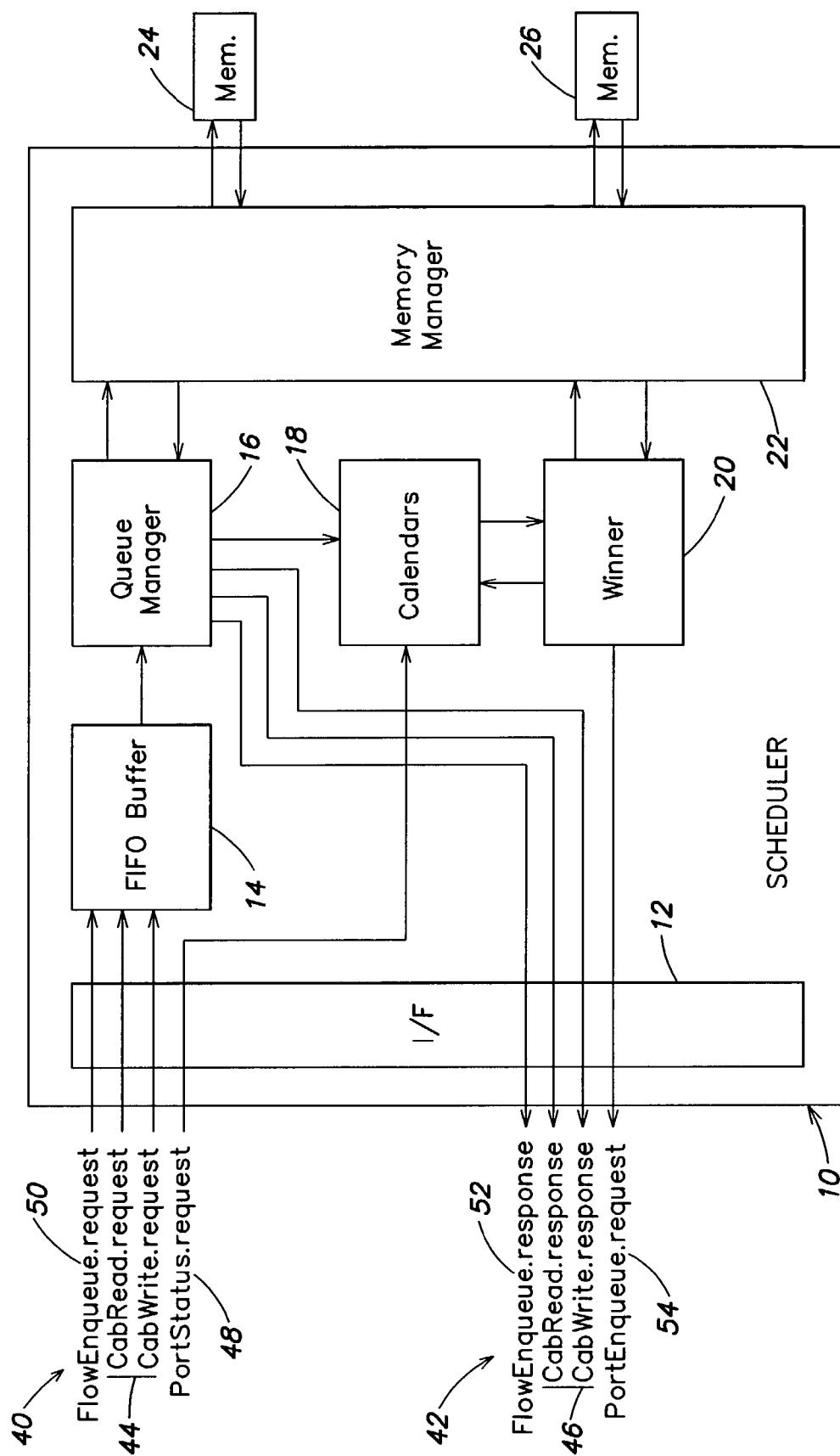
FIG. 1 is a block diagram that illustrates, with associated external memory, a conventional scheduler circuit in which the present invention may be applied.

The following simplified examples illustrate how, in accordance with the invention, bandwidth for a virtual path may be dynamically assigned among active virtual channels associated with the virtual path.

For purposes of a first example, assume that a virtual path is set up to have an average bandwidth of 1 Mbps. Further, assume that three virtual channels are associated with the virtual path, each assigned a nominal bandwidth of 0.5 Mbps, for a total of 1.5 Mbps, which is a typical oversubscribed case. According to an algorithm provided in accordance with the invention, if all three of the virtual channels are active at the same time, the respective nominal bandwidths are scaled by a quotient obtained by dividing the total bandwidth for the virtual path by the sum of the bandwidths for the active virtual channels. In this example, the resulting quotient is $1.0 \div 1.5 = 0.66$. Accordingly, each virtual channel is dynamically reprogrammed to have an average bandwidth of 0.33 Mbps ($0.5 \text{ Mbps} \times 0.66$). If one of the two virtual channels is not active at a given time, then both of the active virtual channels would receive their full nominal bandwidth of 0.5 Mbps. If only one virtual channel is active, then it would receive its full nominal bandwidth. Or, in another embodiment of the invention, if only one virtual channel is active, it may be assigned the entire bandwidth of the virtual path. That is, there could be scaling up of nominal bandwidths, at times when the virtual path is undersubscribed, as well as scaling down of nominal bandwidths for virtual channels at times when the virtual path is oversubscribed.

In the example set forth above, all three of the virtual channels are assigned equal nominal bandwidths. However, it is also contemplated that different nominal bandwidths could be assigned to the various virtual channels. As just one example, a first virtual channel could be assigned a nominal bandwidth of 0.75 Mbps, a second virtual channel could be assigned a nominal bandwidth of 0.5 Mbps, and a third virtual channel could be assigned a nominal bandwidth of 0.25 Mbps. In this example (still assuming a path bandwidth of 1 Mpbs), when all three of the virtual channels are active, the bandwidth for the first virtual channel is scaled down to 0.5 Mbps, the bandwidth for the second virtual channel is scaled down to 0.33 Mbps, and the bandwidth for the third virtual channel is scaled down to 0.16 Mbps.

When only the first and second channels are active, the bandwidth for the first channel is scaled down to 0.6 Mbps and the bandwidth for the second channel is scaled down to 0.4 Mbps. In this case it will be recognized that the scaling factor is 0.8 ($=1.0 \div 1.25$).

As in the previous example, it is also contemplated to provide scaling up of the bandwidths of the virtual channels at times when the virtual path is undersubscribed.

Exemplary data structures and processes to implement the invention will now be described with reference to FIGS. 4–7B. The exemplary data structures and processes disclosed in connection with FIGS. 4–7B can be readily implemented by those of ordinary skill in the art by suitable modifications to the scheduler circuit 10 illustrated in FIG. 1.

Figure 3:
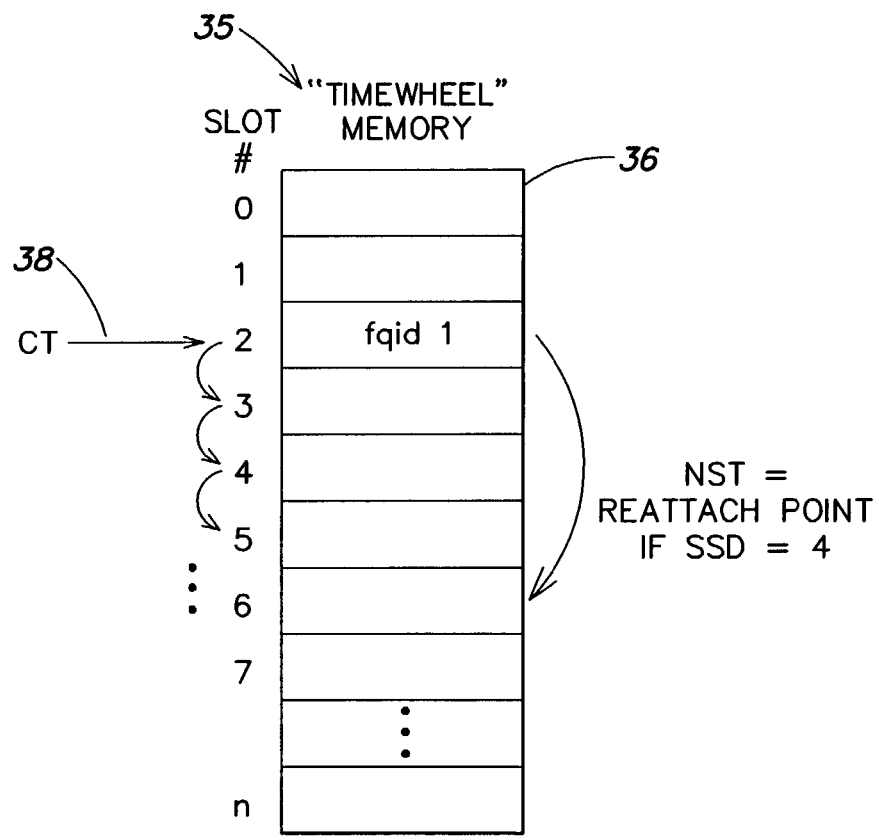
FIG. 3 is a schematic illustration of a conventional time wheel maintained in a calendars block of the scheduler circuit of FIG. 1.
Figure 4:
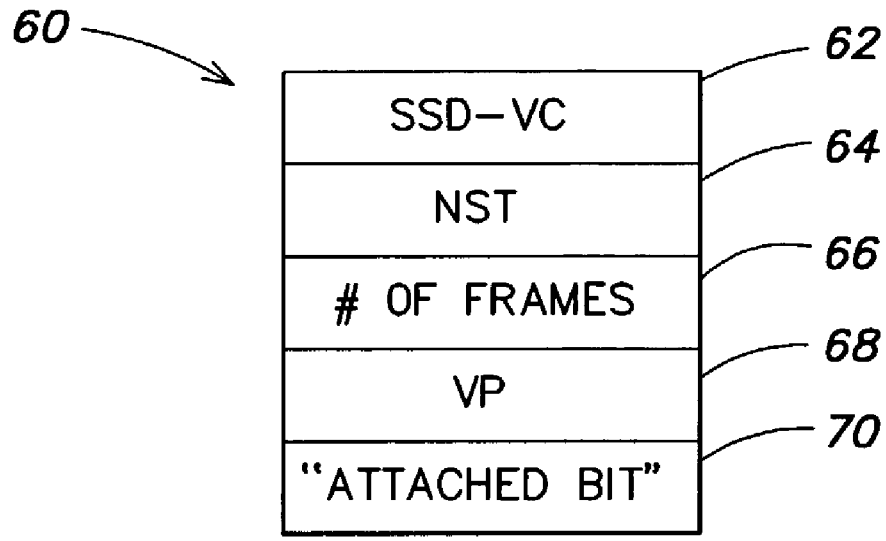
FIG. 4 is a simplified schematic representation of a virtual channel control block maintained in accordance with the present invention.

FIG. 4 is a simplified schematic representation of a virtual channel control block provided in accordance with the invention. The inventive virtual channel control block is generally indicated by reference numeral 60 in FIG. 4. The inventive virtual channel control block 60 includes the following data:

a Sustained Service Distance for the virtual channel (SSD-VC; reference numeral 62) which corresponds to the nominal bandwidth assigned to the virtual channel;

a number of frames (reference numeral 66) which indicates the number of frames currently queued in the flow queue for the virtual channel (with a value of "0" indicating that the flow queue for the virtual channel is empty);

data (VP; reference numeral 68) that identifies a virtual path with which the virtual channel is associated;

an "attached" bit (reference numeral 70) which is set to indicate when the virtual channel is attached to the time wheel (e.g., time wheel 35 in FIG. 3);

a pointer 69 to the position of the head of the flow queue for the virtual channel; and a pointer 71 to the position of the tail of the flow queue for the virtual channel.

Those who are skilled in the art will recognize that header information, and other parameters and data applicable to the virtual channel, have been omitted from FIG. 4 to simplify the drawing.

Figure 5:
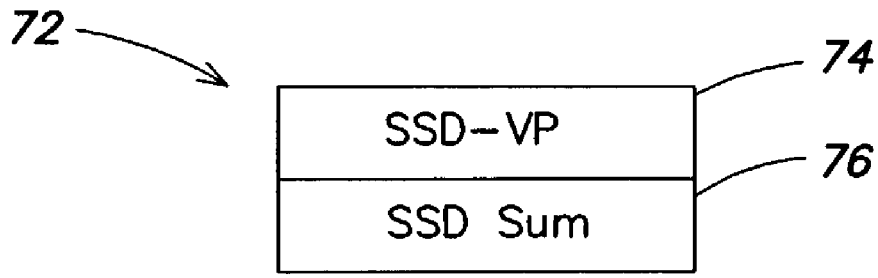
FIG. 5 is a simplified schematic representation of a virtual path control block provided in accordance with the present invention.

FIG. 5 is a simplified schematic representation of a virtual path control block provided in accordance with the invention. Reference numeral 72 generally indicates the inventive virtual path control block. The inventive virtual path control block 72 includes a first parameter 74, which is a Sustained Service Distance that has been assigned to the virtual path (SSD-VP). The inventive virtual channel control block 72 further includes data (SSD Sum; indicated by reference numeral 76) which represents the sum of the nominal Sustained Service Distances (SSD-VC's) for the virtual channels associated with the virtual path that are currently active. A virtual channel is considered to be "active" at times when the virtual channel is attached to the time wheel. A virtual channel will be understood to be "attached" to the time wheel when the flow queue identifier (fqid) for the virtual channel is stored in one of the slots 36 of the time wheel 35 that was discussed above in connection with FIG. 3. A virtual channel is considered to be "inactive" when it is not active.

As will be seen from subsequent discussion, a quotient obtained by dividing SSD-VP (reference numeral 74) by SSD Sum (reference numeral 76) is used in accordance with the invention to dynamically scale the bandwidths for the active virtual channels associated with the virtual path.

Figure 6A:
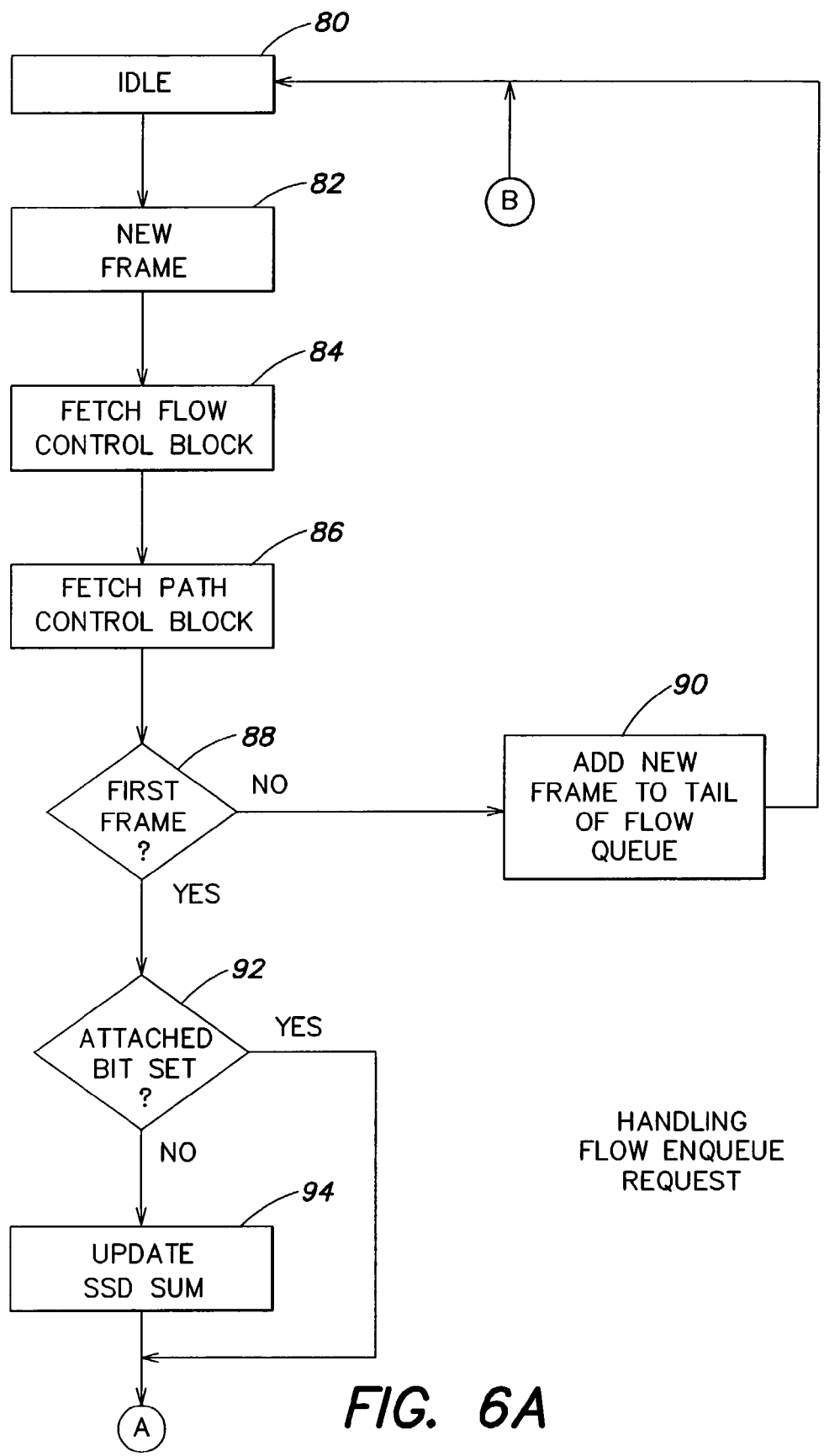
FIGS. 6A and 6B together form a flow chart that illustrates a method provided in accordance with the invention for handling arrival of a new frame to be scheduled for transmission.
Figure 6B:
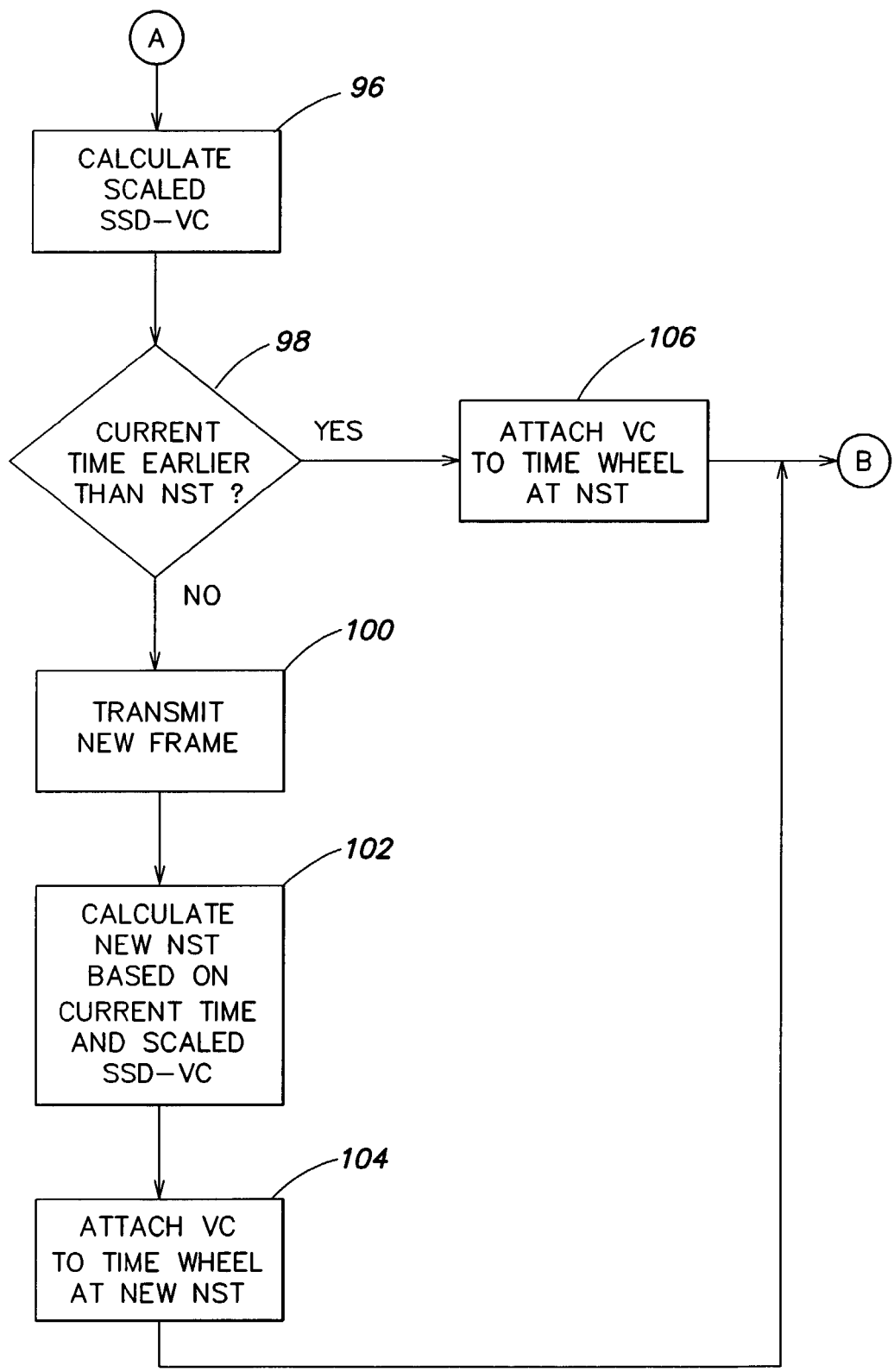

FIGS. 6A–6B together form a flow chart that illustrates a process provided in accordance with the invention for handling new frames which are to be scheduled for transmission. The process of FIGS. 6A–6B initially idles (block 80) awaiting arrival of a new frame (block 82). Arrival of a new frame may be indicated by, e.g., a FlowEnqueue.request 50 illustrated in FIG. 1. The message which indicates arrival of a new frame includes a flow queue identifier or other data which identifies the virtual channel for the new frame. Responsive to arrival of the new frame, the process of FIGS. 6A–6B calls for fetching the flow control block for the virtual channel (virtual channel control block 60; FIG. 4) for the new frame (block 84). Assuming that the virtual channel is associated with a virtual path (as would be indicated by the VP data 68 of the virtual channel control block 60 (FIG. 4)), the path control block for the virtual path (virtual path control block 72; FIG. 5) in question is also fetched (block 86; FIG. 6A).

Figure 2:
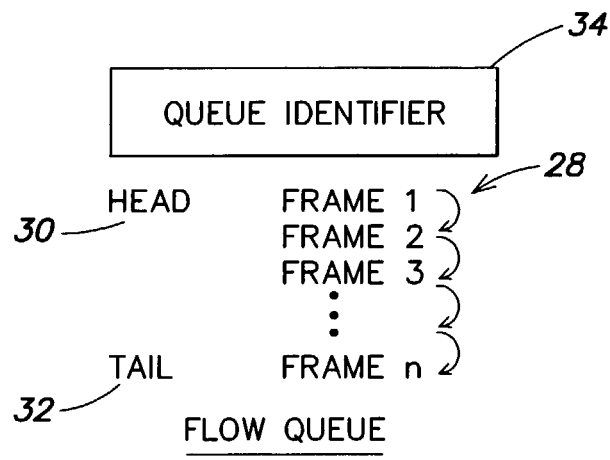
FIG. 2 is a schematic representation of a conventional flow queue that is maintained by the scheduler circuit of FIG. 1 in one of its associated external memories.

Following block 86 is a decision block 88. At decision block 88, it is determined whether the new frame is the first frame for the virtual channel (i.e., it is determined, by reading the number of frames data 66 from the virtual control block 60 (FIG. 4) whether the flow queue for the virtual channel is currently empty). If it is determined at decision block 88 that the new frame is not the first frame for the virtual channel, then block 90 follows decision block 88. At block 90 a pointer corresponding to the new frame is added to the tail (reference numeral 32, FIG. 2) of the flow queue for the virtual channel. The process of FIG. 6A then returns to the idle condition (block 80) to await arrival of another frame.

If at decision block 88 it is determined that the new frame is the first frame for the virtual channel (i.e., that the flow queue for the virtual channel is currently empty), then a decision block 92 follows decision block 88. At decision block 92 it is determined whether the "attached" bit 70 (FIG. 4) in the virtual channel control block is set. If so, then the new frame becomes both the head and the tail of the flow queue for the virtual channel (block 93), and the process of FIG. 6A returns to the idle condition (block 80) to await arrival of another frame.

Considering decision block 92 again, if a negative determination is made at the decision block, then block 94 follows decision block 92. At block 94 the data SSD Sum 76 of the virtual path control block fetched at block 86 is updated. In particular, because the "attached" bit for the virtual channel was not set, the virtual channel, which had been inactive, is in the process of becoming active. Accordingly the SSD-VC 62 (FIG. 4) for the virtual channel must be added to the SSD Sum 76 (FIG. 5) for the virtual path so that, as will be seen, proper scaling can be applied to the SSD-VC's for the virtual channels to be serviced.

Following is block 96 (FIG. 6B). At block 96, the SSD-VC is scaled in accordance with the invention. Specifically, the quotient SSD-VP÷SSD Sum is obtained, and that quotient is multiplied by the SSD-VC, thereby scaling the SSD-VC up or down, as appropriate. The resulting scaled SSD-VC is an enqueuement distance which may be used, as will be seen, to attach the virtual channel to the time wheel (e.g., time wheel 35 in FIG. 3).

Following block 96 is a block 100. At block 100 the newly arrived frame is enqueued for immediate transmission (e.g., by the PortEnqueue.request 54 (FIG. 1)). Following block 100 is block 102. At block 102 a new NST is calculated based on the current time and the scaled SSD-VC that was calculated at block 96. Then, at block 104, the virtual channel is attached to the time wheel by storing the flow queue identifier (fqid) for the virtual channel in the slot of the time wheel (FIG. 3) that corresponds to the NST calculated at block 102. The "attached" bit 70 (FIG. 4) may be set (block 106, FIG. 6B) to indicate that the virtual channel is now attached to the time wheel. The process of FIGS. 6A–6B then returns to the idle condition (block 80, FIG. 6A).

Figure 7A:
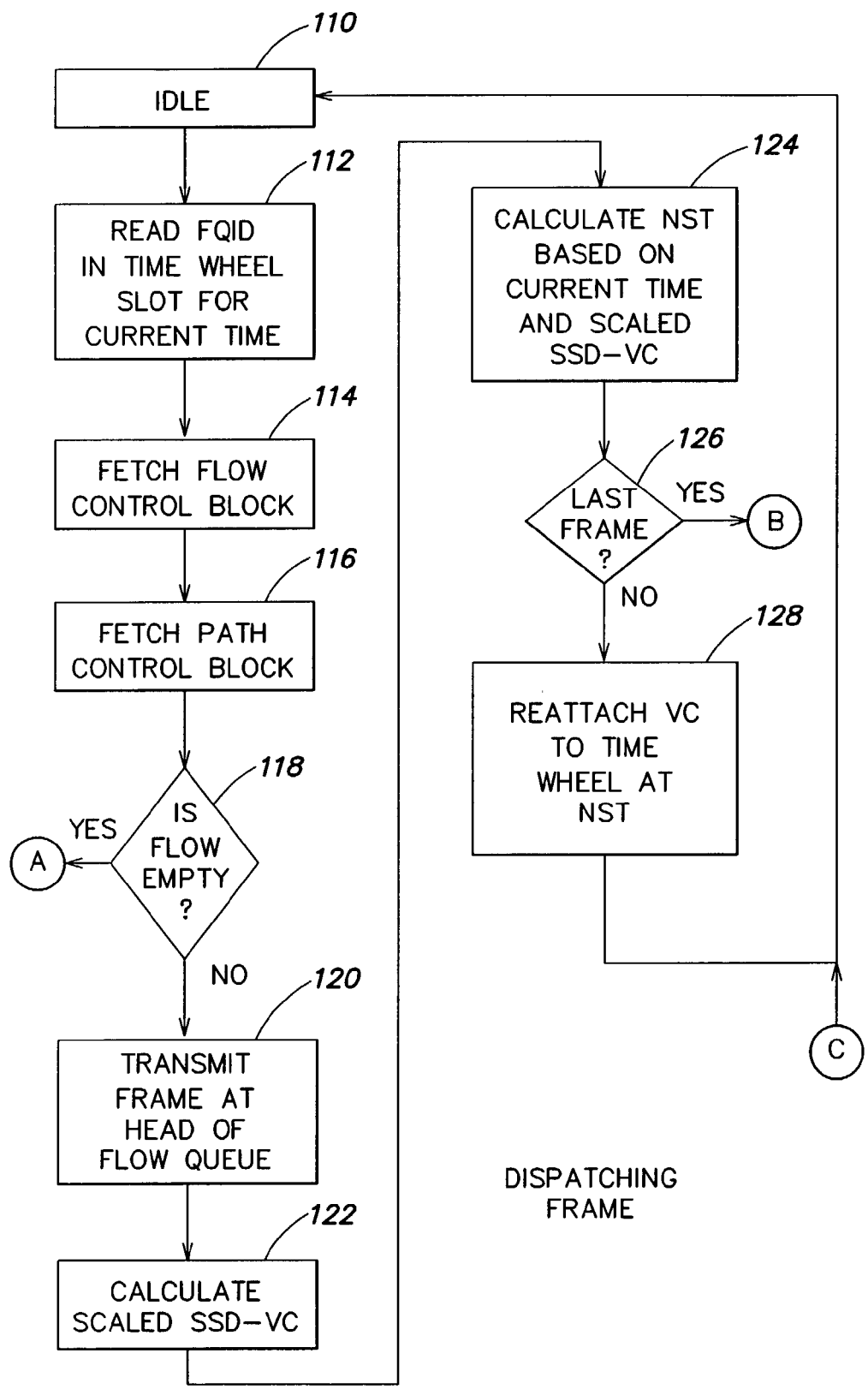
FIG. 7 is a flow chart that illustrates a method provided in accordance with the invention for initiating transmission of a scheduled frame.
Figure 7B:
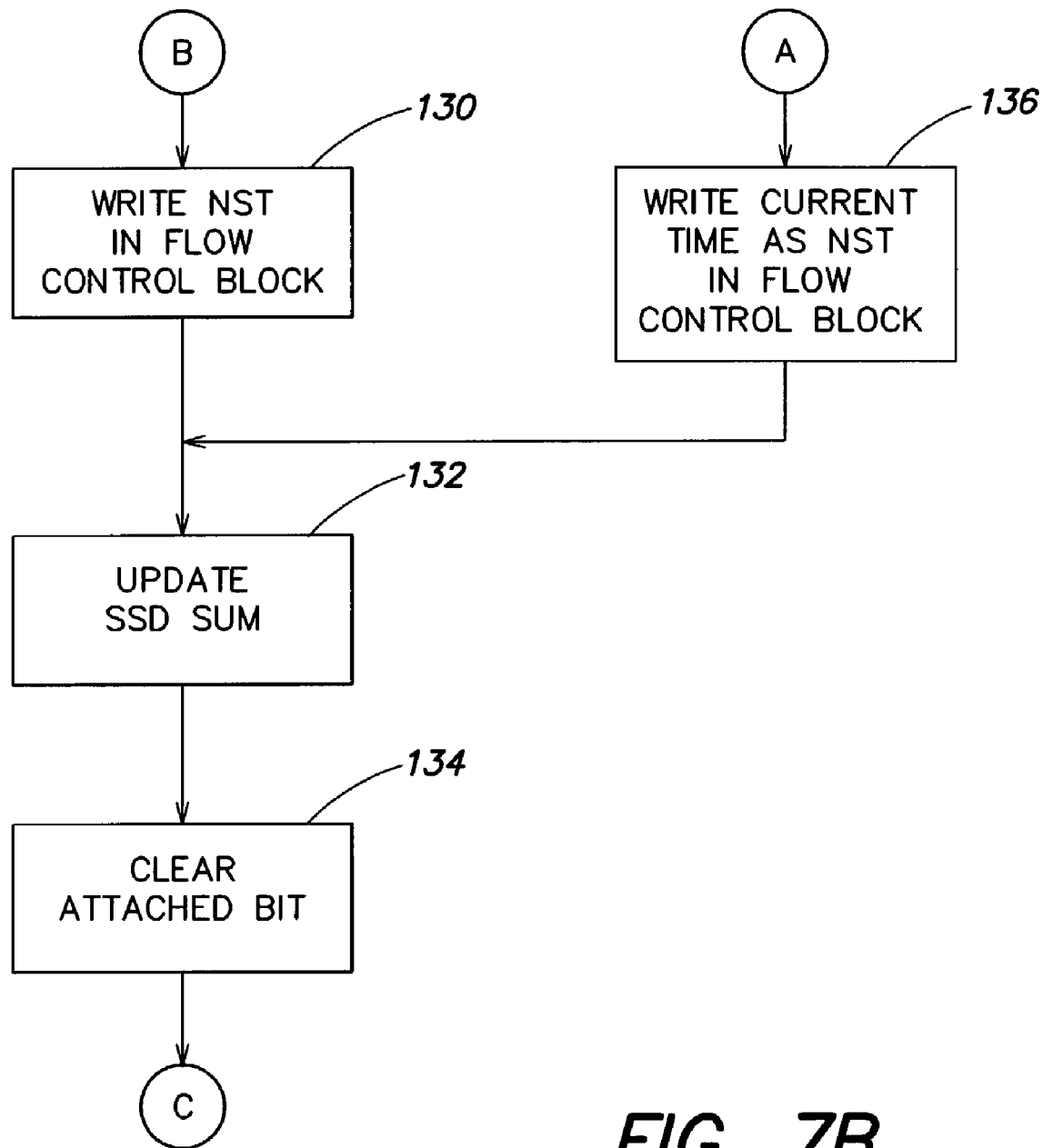

FIG. 7 is a flow chart that illustrates a process provided in accordance with the invention for transmitting frames scheduled via the time wheel (FIG. 3).

Initially the process of FIG. 7 is in an idle condition (block 110), until a flow queue identifier (fqid) is read from the time wheel slot that is pointed to by the current time pointer 38 (CT; FIG. 3). The reading of the fqid is represented by block 112. Then, at block 114, the virtual channel control block indicated by the fqid is fetched. Assuming that the corresponding virtual channel is associated with a virtual path (as would be indicated by VP data 68 in the virtual channel control block (FIG. 4)), the corresponding path control block is also fetched (block 116).

Following block 116 is a decision block 118. At decision block 118, it is determined whether the flow for the virtual channel in question is empty (i.e., whether the number of frames (reference numeral 66, FIG. 4) indicated in the virtual channel control block is 0). If not, then there is at least one frame to transmit for the virtual channel, and block 120 follows. At block 120 the frame pointed to by the head 30 of the flow queue (FIG. 2) is enqueued for transmission (e.g., by the PortEnqueue.request 54 (FIG. 1)). Following block 120 is block 122. At block 122 a scaled SSD-VC is calculated for the virtual channel serviced at block 120. In particular, a quotient is obtained by dividing the parameter SSD-VP (reference numeral 74, FIG. 5) in the virtual path control block fetched at block 116 by the SSD Sum 76 of the virtual path control block. The resulting quotient is employed as a scaling factor and is multiplied by the SSD-VC 62 (FIG. 4) for the virtual channel to arrive at an enqueuement distance for the virtual channel. Then, at block 124, a Next Service Time (NST) is calculated based on the current time and the scaled SSD-VC. That is, the scaled SSD-VC is added to the current time to arrive at NST.

Following block 124 is block 128, at which the virtual channel is reattached to the time wheel at the slot corresponding to the NST calculated at block 124. Following block 128 the process of FIG. 7 returns to the idle condition (block 110).

It is noted that if the calculation of the scaled SSD-VC is performed as described in connection with block 122, then scaling up is permitted for the virtual channels when the virtual path is undersubscribed. However, it is also contemplated that the calculation of the scaled SSD-VC is performed so as not to permit scaling up, in which case the scaled SSD-VC is not allowed to exceed the parameter SSD-VC 62 indicated in the virtual channel control block (FIG. 4) for the virtual channel in question.

Considering again decision block 118, if it is determined that the flow queue is empty for the virtual channel, then block 132 follows decision block 118. At block 132, the data SSD Sum 76 of the virtual path control block (FIG. 5) is updated. That is, because the virtual channel is now becoming inactive, the value of the SSD-VC indicated in the virtual channel control block for the virtual channel is subtracted from SSD Sum for the corresponding virtual path. Then the "attached" bit is cleared (block 134), and the process returns to the idle condition (block 110).

In one embodiment of the invention, the processes of FIGS. 6A–7 are incorporated in suitable logic circuitry that is to be included in accordance with the invention in the winner block 20 and/or the calendars block 18 of the scheduler circuit 10 (FIG. 1). A person of ordinary skill in the art may readily develop such logic circuitry capable of performing the inventive processes described with reference to FIGS. 6A–7. It is an advantage of the present invention that the modifications to the conventional logic circuitry of the winner block 20 and/or the calendars block 18 need not be very extensive.

Alternatively, the processes of FIGS. 6A–7 may be implemented in software (e.g., as one or more computer program products) or in a combination of hardware and software.

Handling of QoS credits for peak traffic situations may be performed essentially in accordance with conventional practices, except for the use of scaled SSDVC's as in the non-peak case illustrated in FIGS. 6A–7B.

The present invention allows the bandwidth assigned to a virtual path to be allocated among virtual channels associated with the virtual path in a manner that is flexible and is dynamically adjusted to variations in activity among the virtual channels. Also, the invention can be implemented with relatively limited modifications to existing scheduler circuits. Further, the present invention accommodates oversubscription of virtual paths, which can be a very attractive feature for service providers and users.

The foregoing description discloses only exemplary embodiments of the invention; modifications of the above disclosed apparatus and methods which fall within the scope of the invention will be readily apparent to those of ordinary skill in the art. For example, the inventive processes described herein are suitable for use in connection with data transmission protocols, such as the well-known Asynchronous Transfer Mode (ATM) in which a fixed-size data frame (or "cell") is used. It is also contemplated to apply the present invention to variable-frame-size transmission protocols. To do so, the enqueuement distance may be scaled in accordance with the size of the data frame that is being transmitted for the virtual channel that is being serviced. For example, a parameter associated with the virtual path, such as a Sustained Service Distance for the virtual path, may be divided by the sum of Sustained Service Distances for the active virtual channels associated with the virtual path. The resulting quotient may be multiplied by the Sustained Service Distance of the virtual channel that is being serviced, and the resulting product may be scaled in inverse proportion to the size of the data frame that is being transmitted to arrive at the enqueuement distance.

Furthermore, although in the above-described description of the inventive processes, process steps have been set forth in a particular order, it is also contemplated to modify the order of the process steps in any manner that is practical.

Accordingly, while the present invention has been disclosed in connection with exemplary embodiments thereof, it should be understood that other embodiments may fall within the spirit and scope of the invention, as defined by the following claims.

The invention claimed is:

1. A method of servicing a first virtual channel that is associated with a virtual path, comprising:
    transmitting a frame associated with the first virtual channel;
    calculating an enqueuement distance for the first virtual channel based on a first parameter associated with the virtual path; and
    attaching the first virtual channel to a time wheel based on the calculated enqueuement distance and a current time pointer for the time wheel.

2. The method of claim 1, wherein the enqueuement distance is calculated based on a quotient obtained by dividing the first parameter by a sum of second parameters each associated with a respective active virtual channel associated with the virtual path.

3. The method of claim 2, further comprising:
    accessing a control block for the virtual path to determine the first parameter and the sum of second parameters.

4. The method of claim 3, wherein the enqueuement distance is calculated by multiplying a second parameter associated with the first virtual channel by the quotient.

5. The method of claim 4, further comprising:
accessing a control block for the first virtual channel to determine the second parameter associated with the first virtual channel.

6. The method of claim 5, wherein the first parameter is a Sustained Service Distance for the virtual path, and the second parameters are Sustained Service Distances for the respective virtual channels.

7. A scheduler circuit for a network processor, comprising:
 a time wheel having a current time pointer;
 means for calculating an enqueuement distance for a virtual channel based on a parameter associated with a virtual path with which the virtual channel is associated; and
 means for attaching the virtual channel to a time wheel based on the calculated enqueuement distance and the current time pointer.

8. A computer program product comprising:
a medium readable by a computer, the computer readable medium having program code adapted to:
 transmit a frame associated with a virtual channel;
 calculate an enqueuement distance for the virtual channel based on a parameter associated with a virtual path with which the virtual channel is associated; and
 attach the virtual channel to a time wheel based on the calculated enqueuement distance and a current time pointer for the time wheel.

* * * * *